US012784376B2

(12) United States Patent
Patel

(10) Patent No.: US 12,784,376 B2
(45) Date of Patent: Nov. 3, 2026

(54) METHOD AND SYSTEM FOR RENDERING MODIFIED SCENE IN AN IMMERSIVE ENVIRONMENT

(71) Applicant: ZEALITY INC, Pleasanton, CA (US)

(72) Inventor: Dipak Mahendra Patel, Pleasanton, CA (US)

(73) Assignee: ZEALITY INC

( * ) Notice: Subject to any disclaimer, the term of this patent is extended or adjusted under 35 U.S.C. 154(b) by 265 days.

(21) Appl. No.: 18/489,883

(22) Filed: Oct. 19, 2023

(65) Prior Publication Data

US 2025/0131661 A1 Apr. 24, 2025

(51) Int. Cl.
*G06T 19/00* (2011.01)
*H04N 13/351* (2018.01)

(52) U.S. Cl.
CPC ......... *G06T 19/006* (2013.01); *H04N 13/351* (2018.05)

(58) Field of Classification Search
CPC ............................ G06T 19/006; H04N 13/351
See application file for complete search history.

(56) References Cited

U.S. PATENT DOCUMENTS

| | | | | |
|---|---|---|---|---|
| 8,531,447 | B2 * | 9/2013 | Walker | G06Q 10/10 345/418 |
| 10,245,507 | B2 * | 4/2019 | Marks | A63F 13/213 |
| 10,559,133 | B2 * | 2/2020 | Knoppert | G06T 19/20 |
| 10,642,991 | B2 * | 5/2020 | Clement | G07F 17/3211 |
| 10,701,320 | B2 * | 6/2020 | Valli | G06T 15/005 |
| 10,796,489 | B1 * | 10/2020 | Cordes | A63F 13/213 |
| 10,819,946 | B1 * | 10/2020 | Tanumihardja | G09B 19/003 |
| 10,930,080 | B2 | 2/2021 | Sai Krishna et al. | |
| 11,006,091 | B2 * | 5/2021 | Liu | G11B 27/28 |
| 11,107,292 | B1 * | 8/2021 | Little | G09B 5/02 |
| 11,169,613 | B2 * | 11/2021 | Fikani | G06F 3/017 |
| 11,281,351 | B2 * | 3/2022 | Nguyen | G06F 3/04845 |
| 11,386,620 | B2 * | 7/2022 | Wieser | G06T 19/20 |
| 11,410,360 | B2 * | 8/2022 | Ruth | G06F 21/6218 |
| 11,461,871 | B2 * | 10/2022 | Chapiro | G02B 27/017 |
| 11,494,528 | B2 * | 11/2022 | Bailey | G06T 19/006 |
| 11,539,918 | B1 * | 12/2022 | Libin | H04L 12/1827 |
| 11,656,835 | B1 * | 5/2023 | Rice | G06F 3/1454 345/419 |
| 11,847,749 | B2 * | 12/2023 | Lebeaupin | G09B 29/106 |
| 11,995,755 | B1 * | 5/2024 | Gelfenbeyn | G06F 3/017 |
| 12,099,695 | B1 * | 9/2024 | Smith | G06F 3/011 |
| 12,153,723 | B2 * | 11/2024 | Hall | A63F 13/837 |
| 12,153,737 | B2 * | 11/2024 | Ramani | G06T 13/20 |
| 12,211,145 | B2 * | 1/2025 | Babu J D | G06T 17/005 |
| 12,288,299 | B2 * | 4/2025 | Ramani | A63F 13/213 |

(Continued)

*Primary Examiner* — Charles L Beard
(74) *Attorney, Agent, or Firm* — Riyon Rae Harding

(57) ABSTRACT

Method, processing unit, and non-transitory computer-readable medium for rendering modified scenes to user in immersive environment are disclosed. Initially, contextual data associated with user in immersive environment is retrieved, during rendering of real-time scene. The real-time scene is analyzed to identify modifiable contents within real-time scene. The modifiable contents are modified based on contextual data, to obtain modified contents. The real-time scene is augmented with modified contents to output modified scene. The modified scene is dynamically rendered to user, by replacing real-time scene with modified scene.

12 Claims, 13 Drawing Sheets

(56) References Cited

U.S. PATENT DOCUMENTS

| | | | | |
|---|---|---|---|---|
| 12,340,557 | B1 * | 6/2025 | Saraee | G06F 16/438 |
| 12,407,792 | B2 * | 9/2025 | Valli | G02B 27/017 |
| 12,626,420 | B2 * | 5/2026 | Azarian Yazdi | G06T 11/00 |
| 12,664,695 | B2 * | 6/2026 | Trzyna | G06T 11/00 |
| 2010/0245376 | A1 * | 9/2010 | Bar-Zeev | G06T 19/20 345/589 |
| 2010/0257463 | A1 * | 10/2010 | Ducheneaut | A61B 34/20 715/757 |
| 2011/0154266 | A1 * | 6/2011 | Friend | A63F 13/213 715/863 |
| 2014/0023995 | A1 * | 1/2014 | Jones | G09B 9/003 434/11 |
| 2014/0192087 | A1 * | 7/2014 | Frost | G06F 3/0325 345/633 |
| 2015/0348326 | A1 * | 12/2015 | Sanders | H04N 5/275 345/633 |
| 2016/0104452 | A1 * | 4/2016 | Guan | G06F 3/0304 345/633 |
| 2016/0364087 | A1 * | 12/2016 | Thompson | H04N 13/351 |
| 2017/0005957 | A1 * | 1/2017 | Han | H04L 51/10 |
| 2017/0236320 | A1 * | 8/2017 | Gribetz | G06F 3/011 345/419 |
| 2017/0357397 | A1 * | 12/2017 | Masumoto | G06T 19/20 |
| 2017/0358140 | A1 * | 12/2017 | Kohler | G02B 27/0172 |
| 2018/0005429 | A1 * | 1/2018 | Osman | A63F 13/56 |
| 2018/0330515 | A1 * | 11/2018 | Stall | G06T 19/003 |
| 2019/0019348 | A1 * | 1/2019 | Yamamoto | G06F 3/017 |
| 2019/0099667 | A1 * | 4/2019 | Chida | A63F 13/655 |
| 2019/0130599 | A1 * | 5/2019 | Gebbie | G06V 40/23 |
| 2019/0130656 | A1 * | 5/2019 | Gebbie | G06T 19/003 |
| 2019/0166175 | A1 * | 5/2019 | Ross | H04L 65/762 |
| 2019/0188918 | A1 * | 6/2019 | Brewer | G06T 19/006 |
| 2019/0250805 | A1 * | 8/2019 | Brewer | G06F 3/04847 |
| 2019/0278844 | A1 * | 9/2019 | Brixey | G06F 40/169 |
| 2019/0304157 | A1 * | 10/2019 | Amer | G06F 16/345 |
| 2019/0325771 | A1 * | 10/2019 | Ghatage | G06F 1/163 |
| 2020/0027364 | A1 * | 1/2020 | Singh | G09B 5/06 |
| 2020/0036816 | A1 * | 1/2020 | Babu J D | A63F 13/352 |
| 2020/0051336 | A1 * | 2/2020 | Ichikawa | G06T 19/006 |
| 2020/0068045 | A1 * | 2/2020 | Tomizuka | H04L 67/131 |
| 2020/0125846 | A1 * | 4/2020 | Laughlin | B29C 70/30 |
| 2020/0134925 | A1 * | 4/2020 | Tomizuka | G06T 19/003 |
| 2020/0139248 | A1 * | 5/2020 | Sefcik | A63F 13/60 |
| 2020/0142475 | A1 * | 5/2020 | Paez | G06F 3/011 |
| 2020/0168119 | A1 * | 5/2020 | Ramani | G06T 19/006 |
| 2020/0201512 | A1 * | 6/2020 | Faulkner | H04L 12/1827 |
| 2020/0225737 | A1 * | 7/2020 | Limor | G06T 15/60 |
| 2020/0320592 | A1 * | 10/2020 | Soule | G06Q 30/0271 |
| 2020/0374645 | A1 * | 11/2020 | Settel | G06F 3/167 |
| 2020/0404078 | A1 * | 12/2020 | Lyer | H04W 4/021 |
| 2021/0090315 | A1 * | 3/2021 | Gladkov | G06F 9/45512 |
| 2021/0099547 | A1 * | 4/2021 | Han | H04L 67/1023 |
| 2021/0135895 | A1 * | 5/2021 | Cheung | G06F 3/0304 |
| 2021/0248827 | A1 * | 8/2021 | Baier | G06T 19/006 |
| 2021/0256261 | A1 * | 8/2021 | Wang | G02B 27/017 |
| 2021/0256769 | A1 * | 8/2021 | Bailey | G06F 3/017 |
| 2021/0312887 | A1 * | 10/2021 | Griswold | G02B 27/0093 |
| 2021/0350604 | A1 * | 11/2021 | Pejsa | G06F 3/012 |
| 2022/0006973 | A1 * | 1/2022 | Kies | G06F 3/011 |
| 2022/0070236 | A1 * | 3/2022 | Yerli | G06F 21/32 |
| 2022/0070237 | A1 * | 3/2022 | Yerli | G06F 3/011 |
| 2022/0070238 | A1 * | 3/2022 | Yerli | G06F 3/011 |
| 2022/0070239 | A1 * | 3/2022 | Yerli | G06F 9/5077 |
| 2022/0139059 | A1 * | 5/2022 | Talwalkar | G06F 3/011 345/419 |
| 2022/0197585 | A1 * | 6/2022 | Nagar | G06F 3/1454 |
| 2022/0222900 | A1 * | 7/2022 | Tomizuka | G06T 19/006 |
| 2022/0277505 | A1 * | 9/2022 | Baszucki | G06T 13/205 |
| 2022/0277525 | A1 * | 9/2022 | Li | G06V 20/635 |
| 2022/0343615 | A1 * | 10/2022 | Tal | G06F 3/016 |
| 2023/0014150 | A1 * | 1/2023 | Bailey | G02B 27/0172 |
| 2023/0044356 | A1 * | 2/2023 | Todd | G06F 3/0482 |
| 2023/0154445 | A1 * | 5/2023 | Bauer | G02B 27/0179 84/609 |
| 2023/0298276 | A1 * | 9/2023 | Patel | H04N 19/115 345/419 |
| 2023/0334754 | A1 * | 10/2023 | Kirchmayer | G06T 15/04 |
| 2024/0005050 | A1 * | 1/2024 | Bailey | G02B 27/0172 |
| 2024/0077937 | A1 * | 3/2024 | Rickwald | G06F 3/01 |
| 2024/0127511 | A1 * | 4/2024 | Brdiczka | G06T 11/60 |
| 2024/0193351 | A1 * | 6/2024 | Benedetto | G06F 16/5866 |
| 2024/0203077 | A1 * | 6/2024 | Martinsen | G06T 19/20 |
| 2024/0242427 | A1 * | 7/2024 | Ackerman | G06F 40/40 |
| 2024/0329795 | A1 * | 10/2024 | Dehkordi | G06F 3/011 |
| 2024/0338993 | A1 * | 10/2024 | Kim | G06F 3/011 |
| 2024/0386627 | A1 * | 11/2024 | Revanur | G06V 10/82 |
| 2024/0404013 | A1 * | 12/2024 | Zhou | G06T 5/50 |
| 2025/0005810 | A1 * | 1/2025 | Sadalgi | G06T 11/00 |
| 2025/0029328 | A1 * | 1/2025 | Smith | H04N 7/157 |
| 2025/0053926 | A1 * | 2/2025 | Lu | G06F 9/45558 |
| 2025/0054278 | A1 * | 2/2025 | Araujo | G06Q 30/0641 |
| 2025/0078369 | A1 * | 3/2025 | Li | G06F 40/216 |
| 2025/0078453 | A1 * | 3/2025 | Saraee | G06F 16/438 |
| 2025/0104311 | A1 * | 3/2025 | Shapira | G06V 10/44 |
| 2025/0104372 | A1 * | 3/2025 | Lee | G06T 19/20 |
| 2025/0119587 | A1 * | 4/2025 | Hinds | H04N 19/70 |
| 2025/0123736 | A1 * | 4/2025 | Zhu | G06T 11/00 |
| 2025/0124262 | A1 * | 4/2025 | Badr | G06N 3/08 |
| 2025/0157164 | A1 * | 5/2025 | Menon | G06F 3/011 |
| 2025/0168308 | A1 * | 5/2025 | Patel | G06T 5/50 |
| 2025/0209753 | A1 * | 6/2025 | Piemonte | G06F 3/011 |
| 2025/0225757 | A1 * | 7/2025 | Menon | G06T 19/20 |
| 2025/0225758 | A1 * | 7/2025 | Menon | G06T 19/20 |
| 2025/0238757 | A1 * | 7/2025 | Howell | G06Q 50/184 |
| 2025/0245491 | A1 * | 7/2025 | Yoo | G06T 11/60 |
| 2025/0245888 | A1 * | 7/2025 | Doroudi | G06T 11/60 |
| 2025/0259406 | A1 * | 8/2025 | Kumar | G06T 19/20 |
| 2025/0267313 | A1 * | 8/2025 | Patel | H04N 21/845 |
| 2025/0315922 | A1 * | 10/2025 | Jawade | H04N 5/272 |
| 2025/0321976 | A1 * | 10/2025 | Isles | G06F 16/258 |
| 2025/0329084 | A1 * | 10/2025 | Weisz | G06N 3/045 |
| 2025/0348753 | A1 * | 11/2025 | Du | G06N 3/0455 |
| 2025/0348788 | A1 * | 11/2025 | Rowe | G06N 20/00 |
| 2025/0349054 | A1 * | 11/2025 | Akerlund | G06V 10/235 |
| 2025/0356539 | A1 * | 11/2025 | Hirano | G06T 11/60 |
| 2025/0356554 | A1 * | 11/2025 | Akiyama | G06T 11/60 |
| 2025/0356672 | A1 * | 11/2025 | Akiyama | G06V 20/70 |
| 2025/0380039 | A1 * | 12/2025 | Bakaus | G06F 16/7844 |
| 2025/0383750 | A1 * | 12/2025 | Lui | G06F 3/04815 |
| 2025/0384532 | A1 * | 12/2025 | Sietzen | G06T 5/70 |
| 2025/0391283 | A1 * | 12/2025 | Rakshit | G09B 5/06 |
| 2026/0010873 | A1 * | 1/2026 | Bowman | G06F 30/10 |
| 2026/0045052 | A1 * | 2/2026 | Schneider | G06N 3/0475 |
| 2026/0056595 | A1 * | 2/2026 | Sharma | G06F 1/3234 |
| 2026/0065551 | A1 * | 3/2026 | Lee | G06T 11/60 |
| 2026/0065560 | A1 * | 3/2026 | Wang | G06T 11/00 |
| 2026/0065635 | A1 * | 3/2026 | Kornuta | G06V 10/761 |
| 2026/0065649 | A1 * | 3/2026 | Huang | G06V 10/774 |
| 2026/0080587 | A1 * | 3/2026 | Jain | G06T 11/60 |
| 2026/0087700 | A1 * | 3/2026 | Gammon | G06T 11/60 |
| 2026/0091792 | A1 * | 4/2026 | Tao | B60W 50/06 |
| 2026/0099970 | A1 * | 4/2026 | Gupta | G06F 3/0483 |
| 2026/0134585 | A1 * | 5/2026 | Khuc | G06T 11/00 |
| 2026/0170781 | A1 * | 6/2026 | Mezerowsky | G06T 19/20 |

* cited by examiner

METHOD AND SYSTEM FOR RENDERING MODIFIED SCENE IN AN IMMERSIVE ENVIRONMENT

FIELD OF THE PRESENT INVENTION

Embodiments of the present invention generally relate to rendering a modified scene to a user in an immersive environment. In particular, embodiments of the present invention relate to a method and a processing unit for dynamically rendering the modified scene to the user based on contextual data associated with the immersive environment.

BACKGROUND OF THE DISCLOSURE

An immersive environment, being experienced by users, may be rendered with content that is priorly generated and predefined. The immersive environment, which is computed-generated digital content, maybe a virtual reality, augmented reality, mixed reality, and so on. The content may be provided as a 360°-view covering the complete surroundings of a user. Some examples of such immersive environments may be a virtual classroom, a virtual meeting, a virtual group discussion, an online presentation, an online gaming platform, a virtual tour of a destination or a real estate property, or live streaming of a game and so on. Usually, all the users within the immersive environment may be provided with the same content. Specifically, objects within the content may be the same for all users. The perspective of the object may only change based on the point of view of each of the users.

Conventional systems teach to modify the entire scene of the immersive environment based on the preferences of the user. One or more recommendations of the scene may be provided to the user and once the user accepts to display the modified scene, the modified scene is rendered to the user. In such a system, inputs from a user are to be received to trigger a modification of the scene.

There exist other systems and methods which teach to use contextual data associated with the user, in real-time, to alter the avatar of the user in the immersive environment. Such systems dynamically gather contextual information which may be behavior, mood, and intent of the user. The contextual information is used to generate representations of the user for the immersive environment.

In the immersive environment with at least one presenter and one or more attendees, each of the attendees may have a dedicated preference. In some cases, the preferences may vary dynamically during rendering of the content in real time. Existing systems and methods focus on modifying the entire scene based on pre-defined preferences or based on requirements of a scene inputted by the user. When an immersive environment comprises a plurality of users, with such systems and methods, it may be difficult to render a scene which satisfies each of the plurality of users as per their preferences and context associated with that user.

Therefore, there is a need for a method and processing unit which teaches to dynamically extract contextual data of the immersive environment in real-time and use the contextual data to modify and render the content to each user as per their preferences.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for rendering a modified scene to a user in an immersive environment are disclosed. Initially, contextual data associated with at least one user amongst a plurality of users in an immersive environment is dynamically retrieved, during rendering of a real-time scene to the at least one user within the immersive environment. The contextual data comprises at least one of context of the real-time scene, real-time conversation between at least two users amongst the plurality of users, type of the at least one user, preferences and inputs of the at least one user, and intent related to rendering of the real-time scene to the at least one user. The real-time scene is analyzed to identify one or more modifiable contents within the real-time scene. The one or more modifiable contents are modified based on the contextual data, to obtain one or more modified contents. The real-time scene is augmented with the one or more modified contents to output a modified scene of the immersive environment. The modified scene is dynamically rendered to the at least one user in the immersive environment, by replacing the real-time scene with the modified scene.

In a non-limiting embodiment, the one or more modifiable contents comprise at least one of one or more modifiable objects amongst plurality of objects present in the real-time scene and one or more modifiable regions within the real-time scene.

In a non-limiting embodiment, modifying the one or more modifiable contents based on the contextual data to obtain the one or more modified contents comprises selecting at least one modifiable object amongst the one or more modifiable objects and modifying the at least one modifiable object based on the contextual data to obtain the one or more modified contents. The contextual data indicates the at least one modifiable object.

In a non-limiting embodiment, modifying the one or more modifiable contents based on the contextual data to obtain the one or more modified contents comprises selecting at least one modifiable region amongst the one or more modifiable regions, based on the contextual data, creating one or more new objects relating to the contextual data and inserting the one or more new objects within the at least one modifiable region to obtain the one or more modified contents.

In a non-limiting embodiment, the plurality of users comprises a presenter and one or more attendees.

In a non-limiting embodiment, when at least one user is one of the presenter and an attendee amongst the one or more attendees, dynamically rendering the modified scene comprises providing a recommendation to the presenter, indicating the modified scene. Further, optionally, an option is provided along with the recommendation, said option prompts dynamic rendering of the modified scene to the at least one user.

The features and advantages of the subject matter hereof will become more apparent in light of the following detailed description of selected embodiments, as illustrated in the accompanying FIGUREs. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1A:
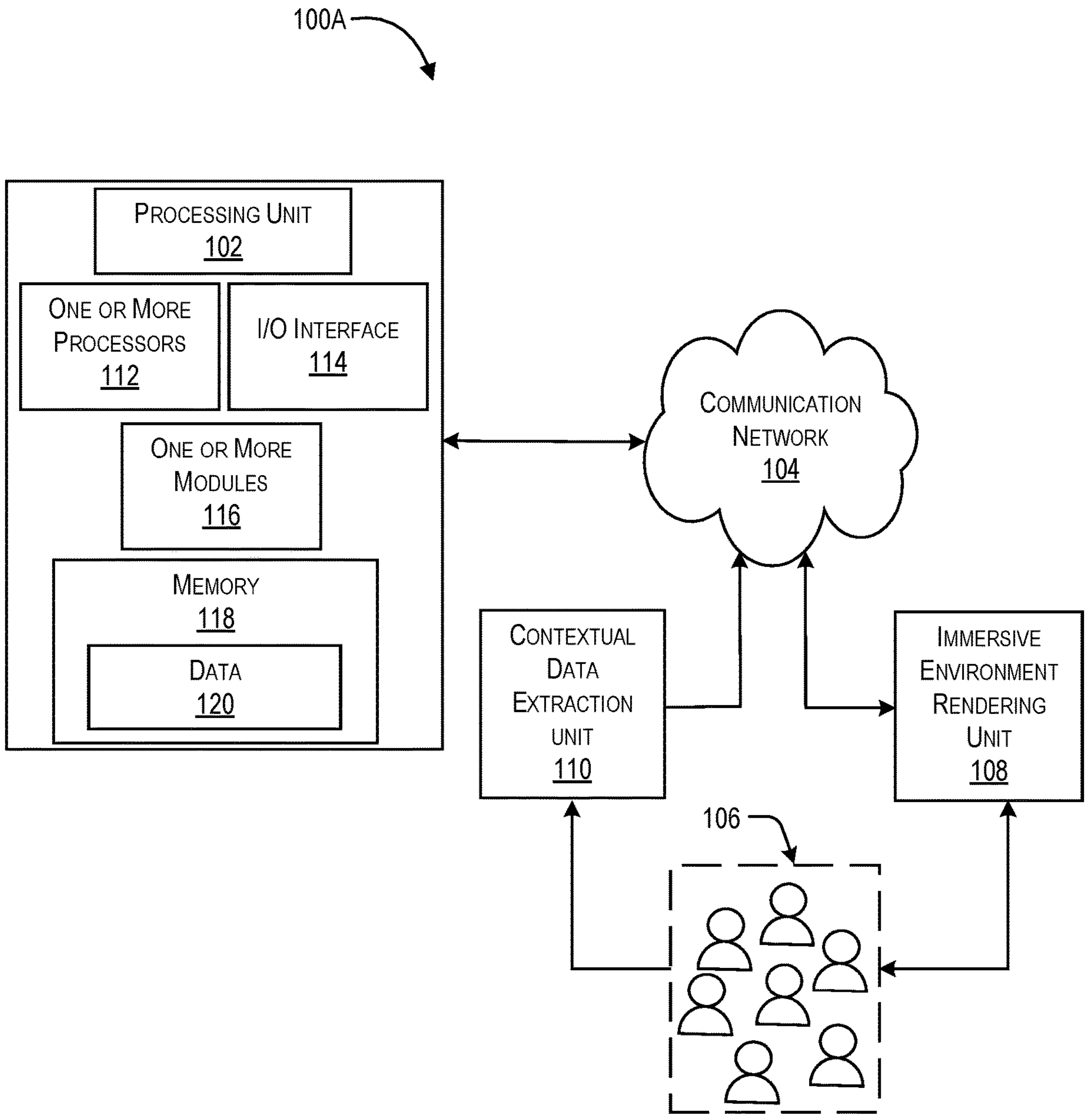
FIGS. 1A and 1B illustrate an exemplary environment with a processing unit for rendering a modified scene to a user in an immersive environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details to provide a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, a processing unit, and a non-transitory computer-readable medium for rendering a modified scene to a user in an immersive environment. A real-time scene of the user is analyzed and modified based on contextual data to render the modified scene to the user. The contextual data comprises at least one of context of the real-time scene, real-time conversation between at least two users amongst the plurality of users, type of the at least one user, preferences and inputs of the at least one user, and intent related to rendering of the real-time scene to the at least one user. The modified scene is generated by modifying contents of the real-time scene and augmenting the modified objects within the real-time scene. Thus, the modified scene is generated as desired by respective user and is dynamically rendered to the user in the immersive environment.

Figure 1B:
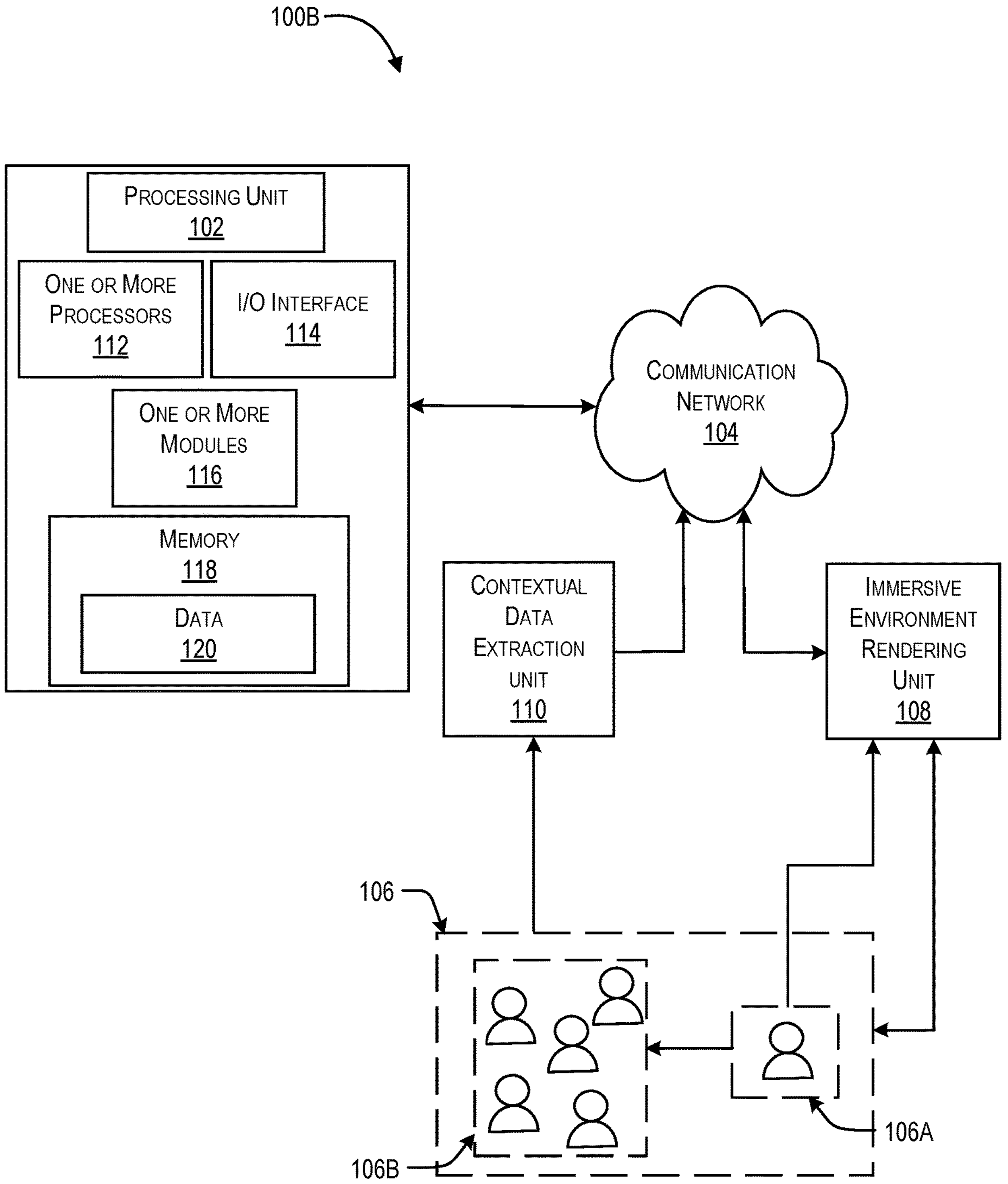

FIG. 1A illustrates an exemplary environment 100A with processing unit 102 for rendering modified scene to a user in an immersive environment, in accordance with an embodiment of the present invention. As shown in FIG. 1A, the exemplary environment 100A comprises the processing unit 102, a communication network 104, a plurality of users 106, an immersive environment rendering unit 108, and a contextual data extraction unit 110. In another exemplary environment 100B, the plurality of users 106 of the immersive environment may include a presenter 106A and one or more attendees 106B as shown in FIG. 1B. The presenter 106A may present content to the one or more attendees 106B in the immersive environment. The exemplary environments 100A and 100B may be the immersive environment to which the plurality of users 106 are connected. In an embodiment, the immersive environment may be any environment that renders immersive content to the plurality of users 106. The immersive environment may be but is not limited to, an extended reality environment/immersive environment, a live-telecast environment, a content streaming environment, a visual communication environment, an online gaming environment, virtual 360° view of a scene, and so on. In an embodiment, the immersive environment may be an environment where the presenter 106A presents the content to the one or more attendees 106B, as shown in FIG. 1B. The content may include, but is not limited to, at least one of video data, audio data, image data, text data, graphics data, and so on. Usually, the presenter 106A may be presenting the content to the one or more attendees 106B in such an environment. Alternatively, the presenter 106A and the one or more attendees 106B amongst the plurality of users 106 may not be pre-defined. Based on access provided to the plurality of users 106 and the requirements, any user, amongst the plurality of users 106, may be the presenter 106A and others may be the one or more attendees 106B, at any instant of time during rendering of the content. In an embodiment, the immersive environment may be a real-time communication session established amongst the plurality of users 106. The content may be but is not limited to, computer-generated data, real-time dynamically generated data, replayed data, pre-defined data, pre-stored data, live telecast data, data, and so on, that may be presented to the one or more attendees 106B by the presenter 106A. In an embodiment, the content may be a scene which is created by overlapping digital images of the scene. In an embodiment, the plurality of users 106 may be connected to the immersive environment via user devices. The user devices may be but are not limited to, at least one of a smartphone, a head-mounted device, smart glasses, a television, a PC, a tablet, a laptop, and so on. In an embodiment, each of the plurality of users 106 may be associated with a dedicated user device. In an alternate embodiment, the at least one presenter 106A may be associated with a dedicated user device, and the one or more attendees 106B may be associated with one or more user devices.

The proposed processing unit 102 and method may be implemented in such an environment that renders the content to the plurality of users 106. The content may be rendered to the user devices of the plurality of users 106. The processing unit 102 may be configured to render a modified scene to a user amongst the plurality of users 106. In an embodiment, the processing unit 102 may be communicatively coupled with the user devices of the plurality of users 106. The processing unit 102 may communicate with user device associated with the user to render the modified scene to the user. In an embodiment, the processing unit 102 may be implemented as a cloud-based server that is configured to communicate with each of the user devices, for rendering the modified scene. In an alternate embodiment, the processing unit 102 may be part of a user device associated with the at least one presenter 106A (not shown in the Figure). In such embodiment, the processing unit 102 may be configured to communicate with the user devices of the one or more attendees 106B and may be configured to render the modified scene to the user amongst the presenter 106A and the one or more attendees 106B.

In an embodiment, for rendering the modified scene, the processing unit 102 may be configured to function in real-time, when the content is rendered to the plurality of users 106. In an embodiment, the processing unit 102 may be configured to function when the at least one presenter 106A is presenting the content to the one or more attendees 106B. During presentation of the content, at every instant of time, the real-time scene rendered to the user is analyzed based on contextual data associated with the immersive environment. Based on the analyses, the modified scene is created and the real-time scene is replaced with the modified scene for the user.

Further, the processing unit 102 may be in communication with each of the immersive environment rendering unit 108 and the contextual data extraction unit 110. The immersive environment rendering unit 108 may be configured to at least render immersive content to the plurality of users 106. In an embodiment, the immersive content may be dynamically generated by the immersive environment rendering unit 108 and rendered to the plurality of users 106 connected to the immersive environment. In an embodiment, the immersive content may be pre-stored and rendered to the plurality of users 106 in real-time by the immersive environment rendering unit 108. The contextual data extraction unit 110 may be configured to extract contextual data from the immersive environment. The contextual data may include but is not limited to, at least one context of the real-time scene, real-time conversation between at least two users amongst the plurality of users 106, type of the at least one user, preferences and inputs of the at least one user, and intent related to rendering of the real-time scene to the at least one user. In an embodiment, one or more data amongst the contextual data may be extracted prior to rendering of the immersive content and pre-stored in the contextual data extraction unit 110. Such one or more data may include the type of the at least one user, the intent, the preferences of the at least one user, and so on. In another embodiment, some of the contextual data may be extracted in real-time during rendering of the content to the plurality of users 106. Such data may include the real-time conversations, the context of the real-time scene, the inputs of the at least one user, and so on.

In an embodiment, the processing unit 102 may be connected with the user devices associated with the plurality of users 106, the immersive environment rendering unit 108, and the contextual data extraction unit 110 via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user devices, the immersive environment rendering unit 108, and the contextual data extraction unit 110 via a corresponding dedicated communication network (not shown in FIGS.).

Figure 2:
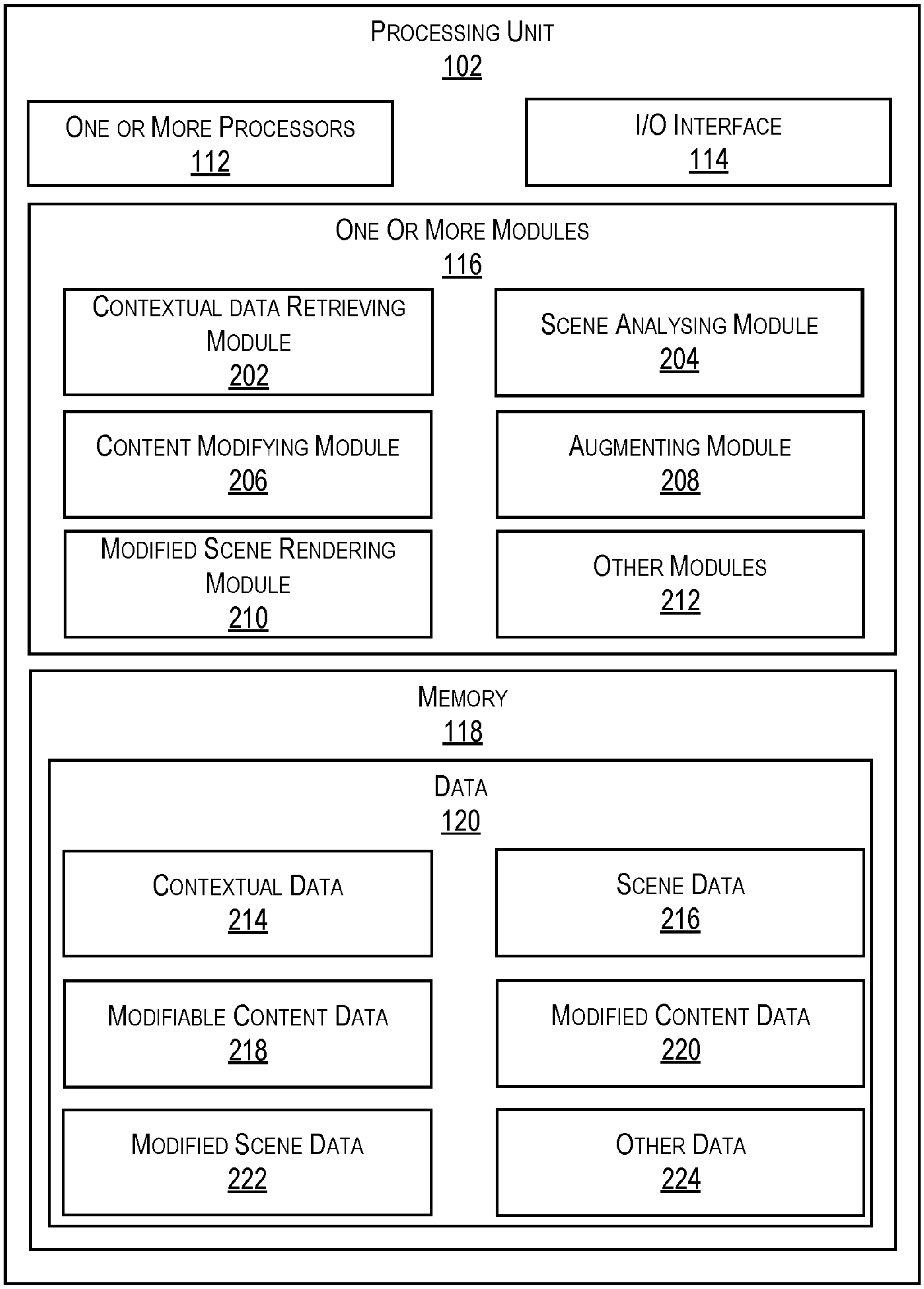
FIG. 2 illustrates a detailed block diagram showing functional modules of a processing unit for rendering a modified scene to a user in an immersive environment, in accordance with an embodiment of the present invention.

FIG. 2 shows a detailed block diagram of the processing unit 102 for rendering the modified scene to the user, in accordance with some non-limiting embodiments or aspects of the present disclosure. The processing unit 102 may include one or more processors 112, an Input/Output (I/O) interface 114, one or more modules 116, and a memory 118. In some non-limiting embodiments or aspects, the memory 118 may be communicatively coupled to the one or more processors 112. The memory 118 stores instructions, executable by the one or more processors 112, which on execution, may cause the processing unit 102 to render modified scene to the user. In some non-limiting embodiments or aspects, the memory 118 may include data 120. The one or more modules 116 may be configured to perform the steps of the present disclosure using the data 120 to render the modified scene. In some non-limiting embodiments or aspects, each of the one or more modules 116 may be a hardware unit, which may be outside the memory 118 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 116 may be implemented with a cloud-based server, communicatively coupled with the processing unit 102.

The data 120 in the memory 118 and the one or more modules 116 of the processing unit 102 are described herein in detail. In one implementation, the one or more modules 116 may include but is not limited to, a contextual data retrieving module 202, a scene analyzing module 204, a content modifying module 206, an augmenting module 208, a modified scene rendering module 210 and one or more other modules 212 associated with the processing unit 102. In some non-limiting embodiments or aspects, the data 120 in the memory 118 may include contextual data 214, scene data 216 (herewith also referred to as real-time scene 216), modifiable content data 218 (herewith also referred to as one or more modifiable contents 218), modified content data 220 (herewith also referred to as one or more modified contents 220), modified scene data 222 (herewith also referred to as modified scene 222) and other data 224 associated with the processing unit 102.

In some non-limiting embodiments or aspects, the data 120 in the memory 118 may be processed by the one or more modules 118 of the processing unit 102. In some non-limiting embodiments or aspects, the one or more modules 118 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 118 of the present disclosure renders the modified scene 222 to the at least one user. The one or more modules 118 along with the data 120, may be implemented in any system for rendering the modified scene 222 to the at least one user in the immersive environment.

Figure 3A:
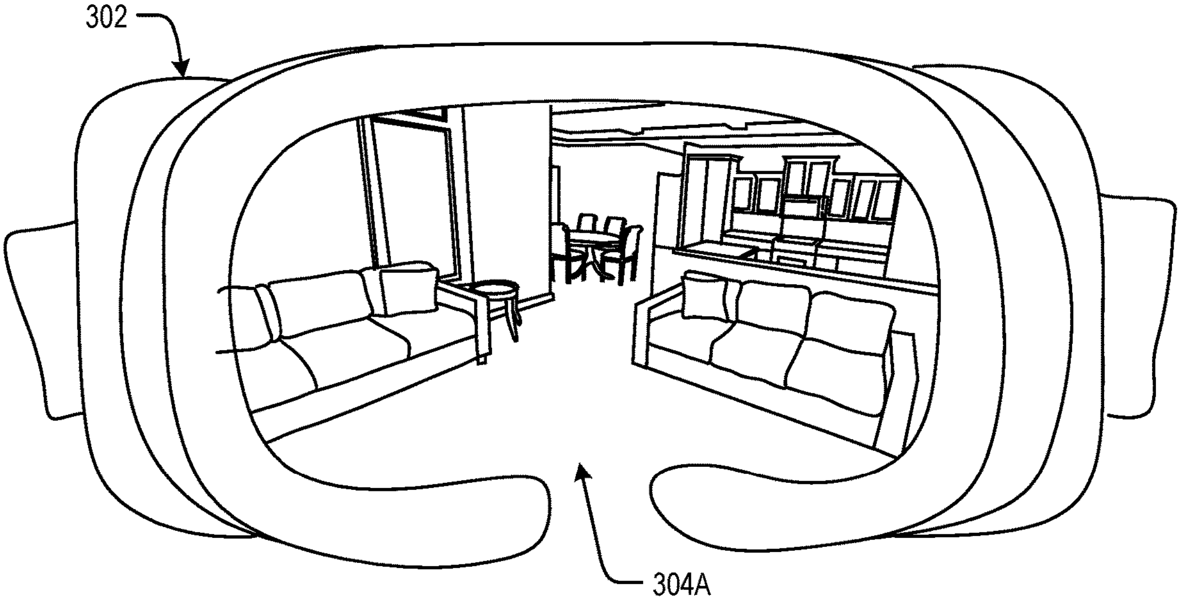
FIGS. 3A-3F show exemplary embodiments for rendering a modified scene to a user in an immersive environment, in accordance with an embodiment of the present invention.
Figure 3B:
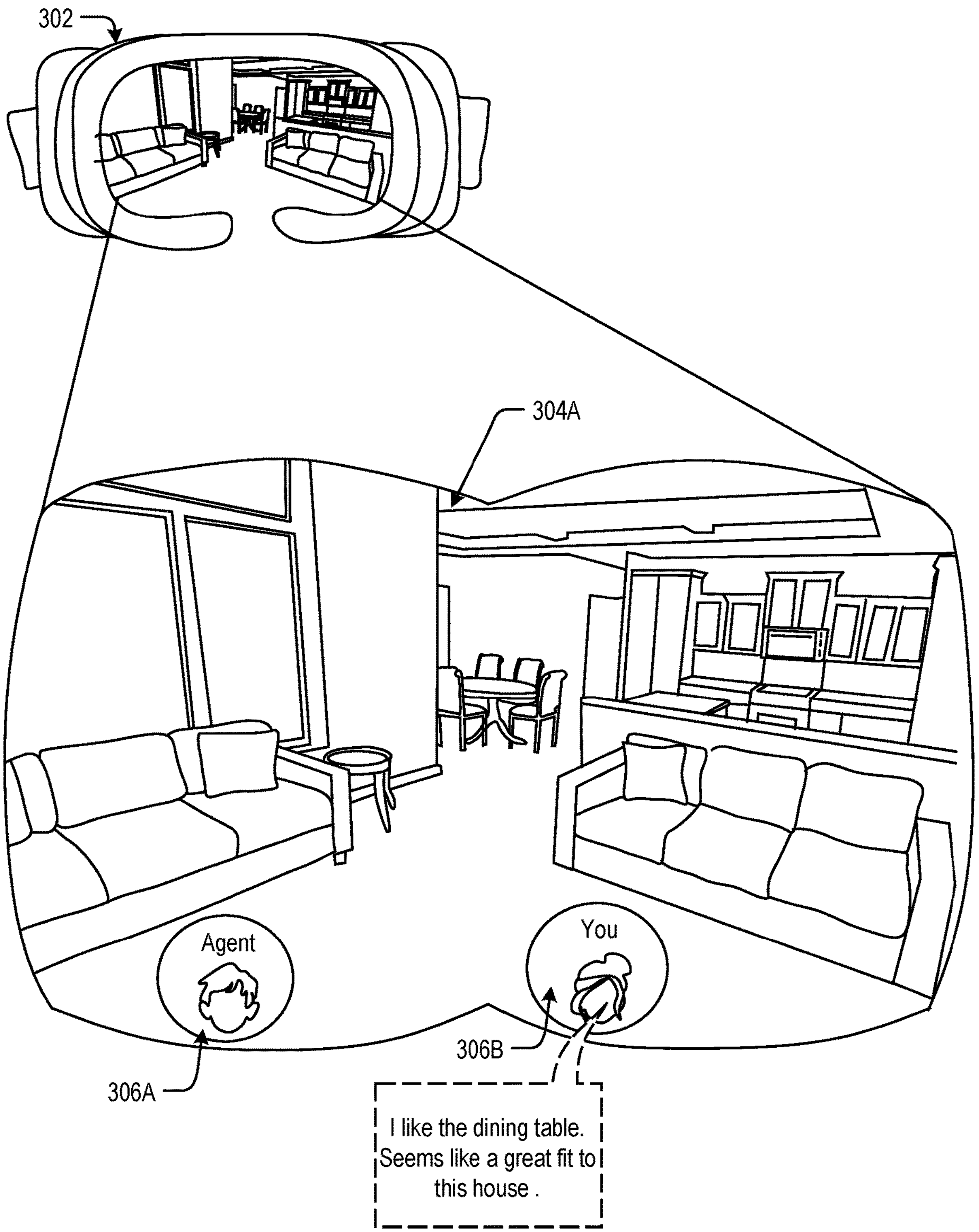

In the immersive environment, the content rendered to the plurality of users 106 comprises multiple scenes which may be rendered to the plurality of users 106 at different instances of time. For example, consider the immersive environment includes a virtual tour of a real estate property to plurality of users 106 as shown in FIG. 3A. The scenes may include but are not limited to, view of kitchen, view of living room, view from a balcony, view inside a bedroom and so on. Such scenes may be presented to the users within the immersive environment. The users of such immersive environment may include a plurality of users 106. In an embodiment, the plurality may include an agent as the presenter and one or more customers as the one or more attendees. Consider the virtual tour of the real-estate property including agent 306A and customer 306B as shown in FIG. 3B. The processing unit 102 may be configured to modify the scenes for at least one user amongst the plurality of users 106 of the immersive environment. The scene provided in real-time may be analyzed and modified based on the contextual data 214. During rendering of the real-time scene 216, the contextual data 214 associated with the at least one user amongst the plurality of users 106 is dynamically retrieved. In an embodiment, the contextual data retrieving module 202 may be configured to retrieve the contextual data 214 associated with each of the plurality of users 106. Respective contextual data 214 is used to modify the real-time scene 216 of corresponding user from the plurality of users 106.

In an embodiment, the contextual data 214 comprises at least one of context of the real-time scene 216, real-time conversation between at least two users amongst the plurality of users 106, type of the at least one user, preferences and inputs of the at least one user, and intent related to rendering of the real-time scene 216 to the at least one user. The context of the real-time scene 216 may indicate situation associated with the scene. In an embodiment, the context of the real-time scene 216 may indicate perspective or point of view of the user. For example, in the virtual tour of the real-estate property illustrated in FIGS. 3A and 3B, the context of the real-time scene 216 is the living room with the view of dining table and kitchen. The real-time conversation represents conversations between the users within the immersive environment. For example, the plurality of users 106 in a classroom environment includes a professor and students. The conversation between the professor and the students may be recorded during rendering of the content and retrieved as the real-time conversation. Similarly, for the virtual tour of the real-estate property illustrated in FIG. 3B, conversation between the agent 306A and the customer 306B may be recorded and retrieved as the real-time conversation. Type of the user may indicate if the user is a presenter or an attendee. In some embodiment, the type of the user may indicate if the user is a host or a guest of the immersive environment. The preferences of the at least one user may indicate preferences related to the real-time scene 216. The preferences may be related to color, interest in a particular object within the scene, and so on. The preferences may be pre-fed data inputted by the at least one user. The inputs may be dynamics inputs that are provided by the at least one user during rendering of the real-time scene 216. The intent may indicate the intent of rendering the real-time scene 216 to the at least one user. For example, in the virtual tour of the real-estate property, intent may be for renting the real-estate property or purchasing the real-estate property. In another embodiment, the intent may indicate if the real estate property is viewed for home space or office space.

In an embodiment, the contextual data retrieving module 202 may retrieve the contextual data 214 from the contextual data extraction unit 110. The contextual data extraction unit 110 may be configured to extract the contextual data 214 from the immersive environment. The contextual data extraction unit 110 may include one or more sensors and applications that enable to extract the contextual data 214 from the immersive environment. The one or more sensors may include microphone, camera, and so on. The microphone may be used to record the real-time conversation of the at least two users. The camera may be used to detect the at least one user. Further, the applications may be image processing applications which may captures images within the immersive environment to extract the contextual data 214. In an embodiment, some of the contextual data 214 may be pre-fed to the contextual data extraction unit 110. The contextual data extraction unit 110 may store the contextual data 214 and the contextual data retrieving module 202 may retrieve the contextual data 214 from the contextual data extraction unit 110 during rendering of the real-time scene 216.

Figure 3C:
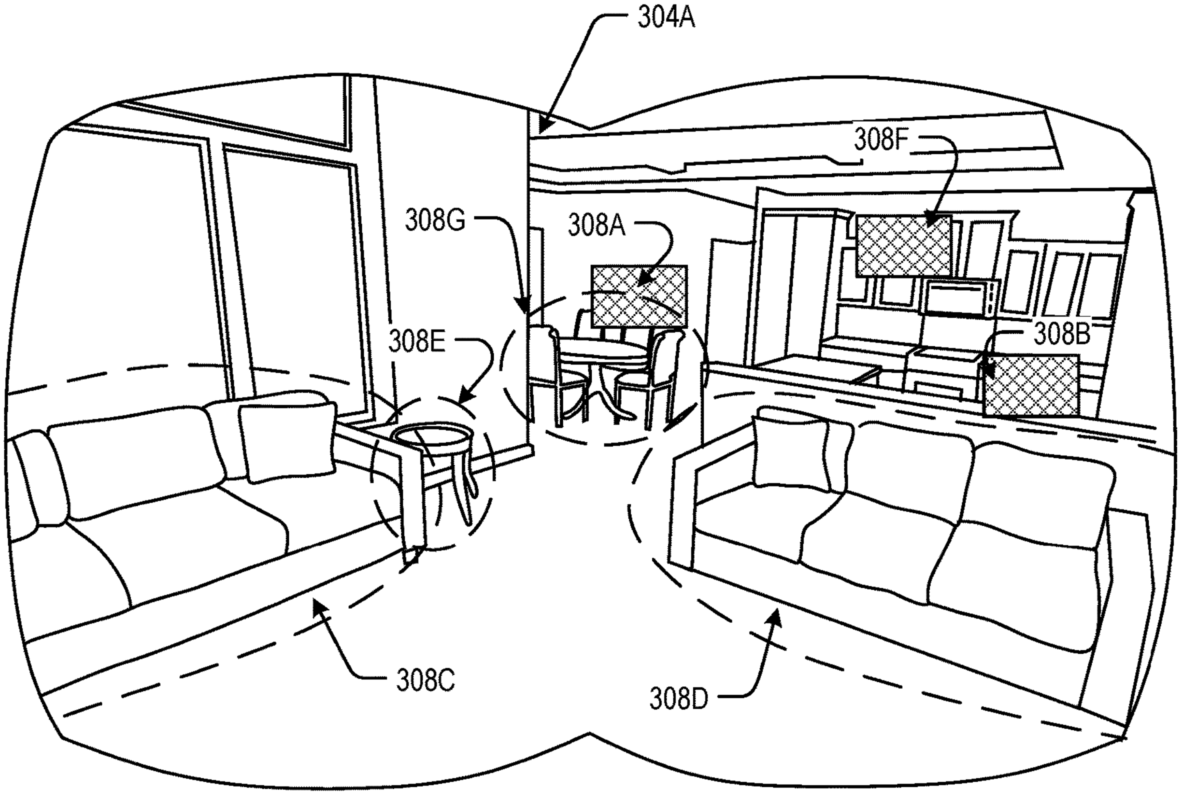

Further, the scene analyzing module 204 is configured to analyze the real-time scene 216 which is presented to the at least one user. The real-time scene 216 is analyzed to identify one or more modifiable contents 218 within the real-time scene 216. The one or more modifiable contents 218 include contents within the real-time scene 216, which may be modified for the at least one user. In an embodiment, the one or more modifiable contents 218 may include one or more modifiable objects amongst plurality of objects present in the real-time scene 216. In an embodiment, the one or more modifiable contents 218 may include one or more modifiable regions within the real-time scene 216. In an embodiment, the one or more modifiable contents 218 may include one or more modifiable objects and the one or more modifiable regions. In an embodiment, the one or more modifiable contents 218 may be predefined and stored as the data in the processing unit 102. The content that is to be rendered in the immersive environment may be used to predefine the one or more modifiable contents 218. In an embodiment, the content may be split into scenes and each scene of the content may be mapped with the one or more modifiable contents 218. In real-time, when the real-time scene 216 is analyzed, the one or more modifiable contents 218 mapped with the real-time scene 216 may be identified. FIG. 3C shows an exemplary representation of one or more modifiable contents 218 associated with the real-time scene 304A. The one or more modifiable contents 218 include first modifiable region 308A, second modifiable region 308F, third modifiable region 308B, first modifiable object 308C, second modifiable object 308D, third modifiable object 308E, and fourth modifiable object 308G. The one or more modifiable contents 218 may vary for each scene of the content.

The content modifying module 206 may be configured to modify one or more modifiable contents 218 based on the contextual data 214. The one or more modifiable contents 218 are modified to obtain one or more modified contents. The modified contents may represent the one or more modifiable contents 218 as per the preferences of the at least one user. In an embodiment, the content modifying module 206 may modify the one or more modifiable contents 218 by selecting at least one modifiable object amongst the one or more modifiable objects and modifying the at least one modifiable object based on the contextual data 214 to obtain the one or more modified contents. The contextual data 214 indicates the at least one modifiable object. In an embodiment, the content modifying module 206 may modify the one or more modifiable contents 218 by selecting at least one modifiable region amongst the one or more modifiable regions based on the contextual data 214. Further, the content modifying module 206 creates one or more new objects relating to the contextual data 214 and inserts the one or more new objects within the at least one modifiable region to obtain the one or more modified contents.

Figure 3D:
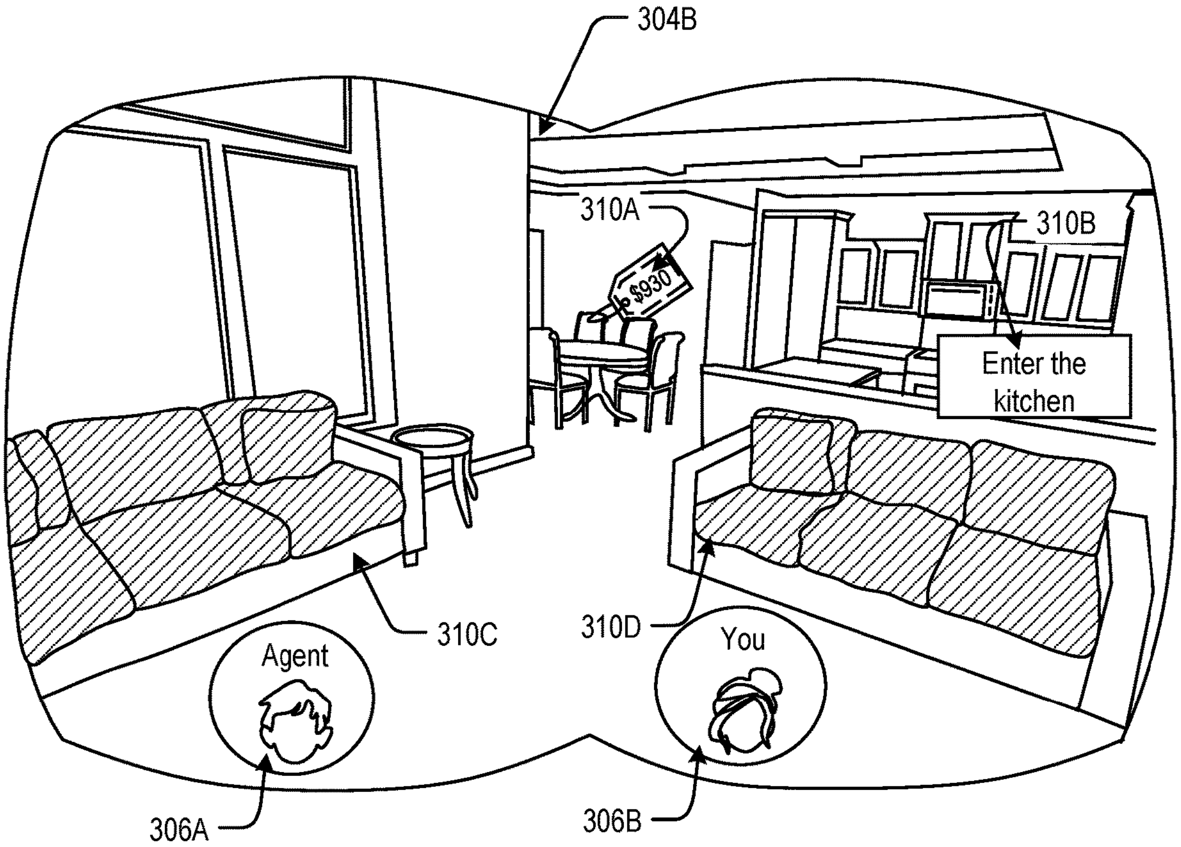

The augmenting module 208 may be configured to augment the real-time scene 216 with the one or more modified contents. Upon augmenting the real-time scene 216, a modified scene 222 of the immersive environment may be outputted. The modified scene rendering module 210 is configured to dynamically render the modified scene to the at least one user in the immersive environment, by replacing the real-time scene with the modified scene 222. For example, consider the scenario illustrated in FIG. 3A. The contextual data 214 may include the real-time conversation between the agent 306A and the customer 308B and a one or more preferences of the customer. The real-time conversation may include a speech from the customer stating the "I LIKE THE DINING TABLE. SEEMS LIKE A GREAT FIT TO THIS HOUSE". The one or more preferences of the customer may include a preferred color and hobby to be cooking. Thus, the one or more modified contents 220 may be generated to be first modified content 310A, second modified content 310B, and third modified content 310C, as shown in FIG. 3D. Further, the first modified content 310A, the second modified content 310B and the third modified content 310C are augmented to the real-time scene 304A to output the modified scene 304B as shown in FIG. 3D.

Figure 3E:
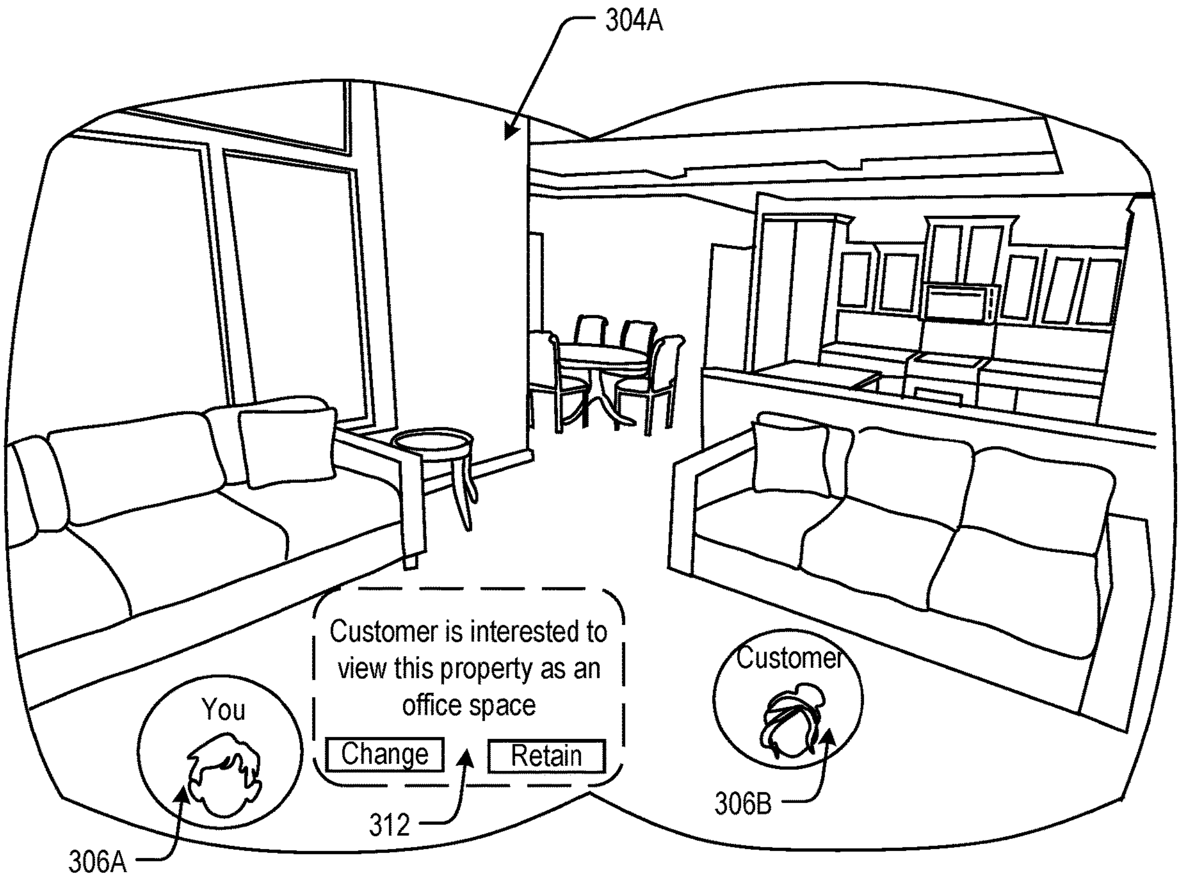
Figure 3F:
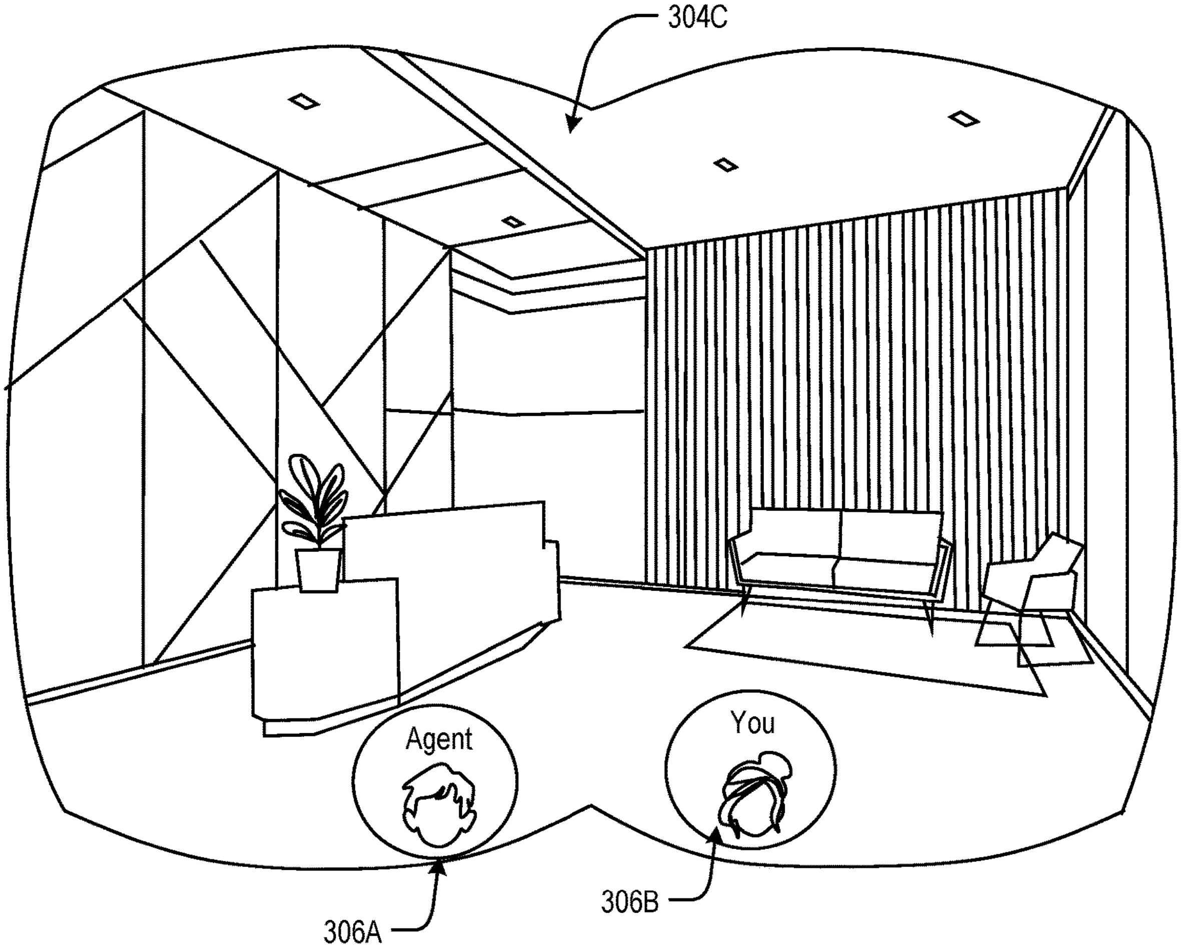

Further, when at least one user is one of the presenter 106A and the attendee 106B, the modified scene rendering module 210 may be configured to provide a recommendation to the presenter 106A, indicating the modified scene 222. The presenter 106A may be displayed with an option which may prompt dynamic rendering of the modified scene 222 to the at least one user. That is, the option may allow the presenter 106A to either retain the real-time or render the modified scene 222 to the at least one user. For example, consider a scenario illustrated in FIG. 3E. The context from the contextual data 214 may indicate to show office space in the real estate property. Thus, a recommendation 312 may be generated and provided to the agent as shown in FIG. 3E. Further, the agent 306A may be provided options to either retain the real-time scene 304A or change to render a modified scene 222. In case the agent 306A select the option to change, the customer 306B may be rendered a modified scene 304C, as shown in FIG. 3F. In an embodiment, based on the contextual data 214, the entire real-time scene 216 may be modified to generate a new scene for the at least one user.

Figure 4:
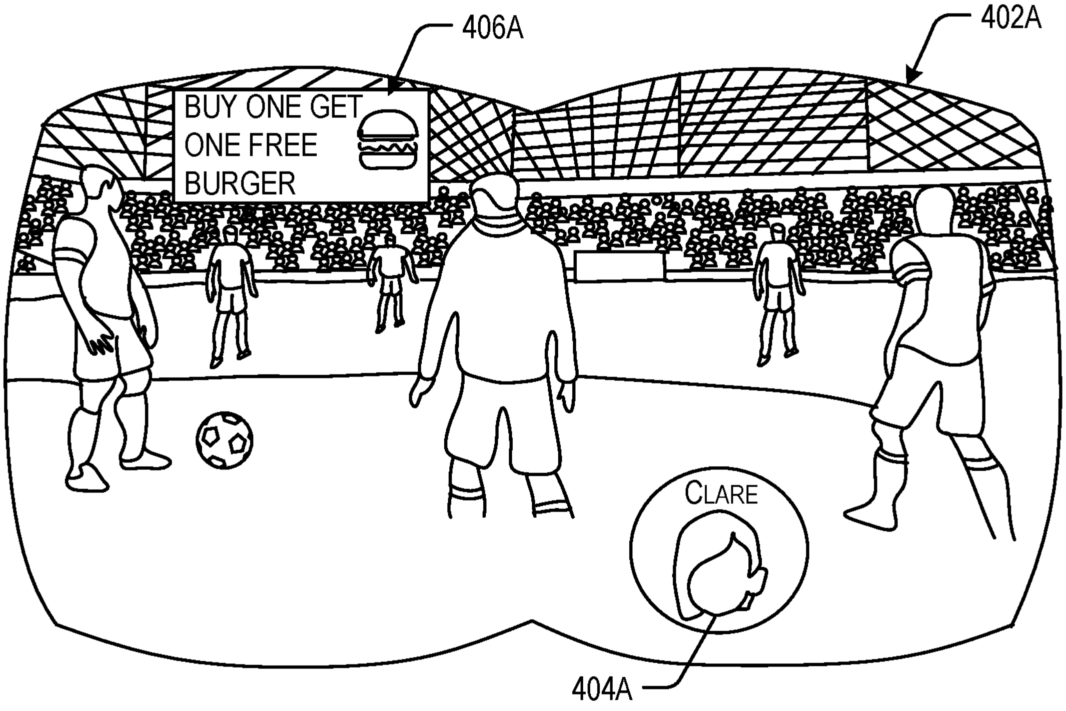
FIG. 4 is an exemplary process of processing unit for rendering a modified scene to a user in an immersive environment, in accordance with an embodiment of the present invention.
Figure 4:
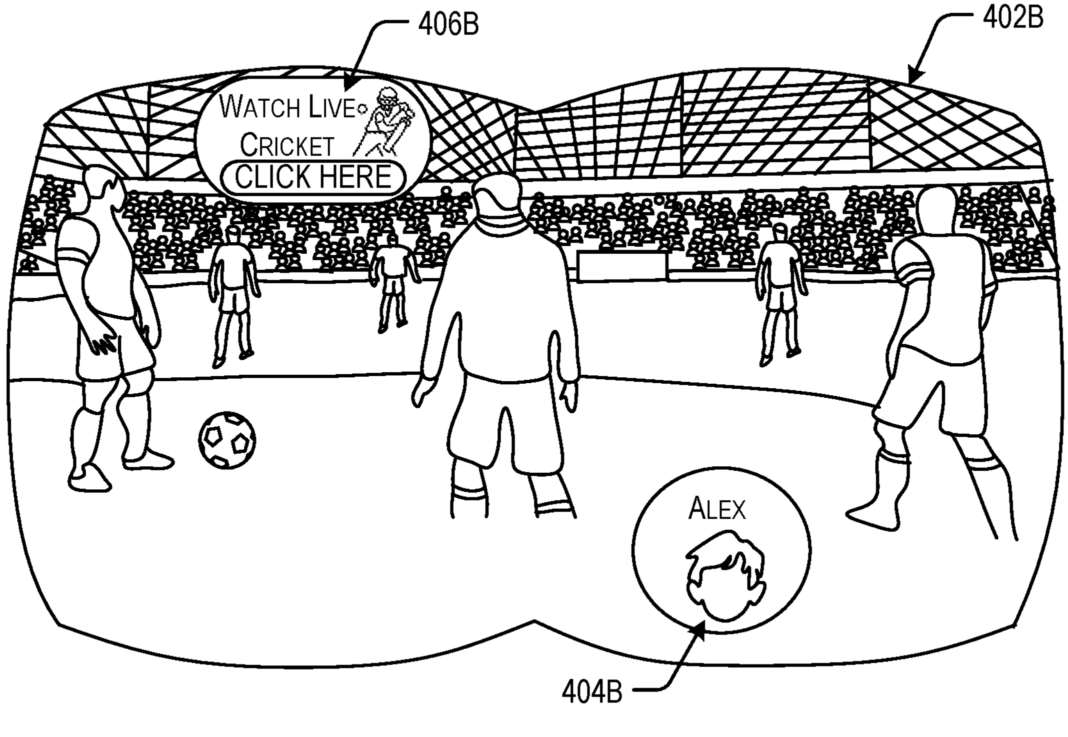

FIG. 4 illustrates another scenario when plurality of users are viewing a football game in an immersive environment. Based on the contextual data 214 and analyses of the real-time scene 216, the modified scene 222 may be rendered to each of the users in the immersive environment. In an embodiment, the modified scene 222 may customize an advertisement based on the contextual data 214. For example, consider user 404A is conversing about being hungry during viewing of the game. Thus, the modified scene 402A may be generated by augmenting a modified object 406A with original scene rendered to the user 404A. The modified object 406A is an ad which is generated based on the context of the conversation of the user 404A. In an embodiment, one or more subsequent scenes may also be modified to be augmented with the modified object 406A Consider another scenario where user 404B has a preference for cricket over football. Thus, the modified scene 402B may be generated by augmenting a modified object 406B with original scene rendered to the user 404B. The modified object 406B is an ad which is generated based on preference of the user 404B.

Figure 5:
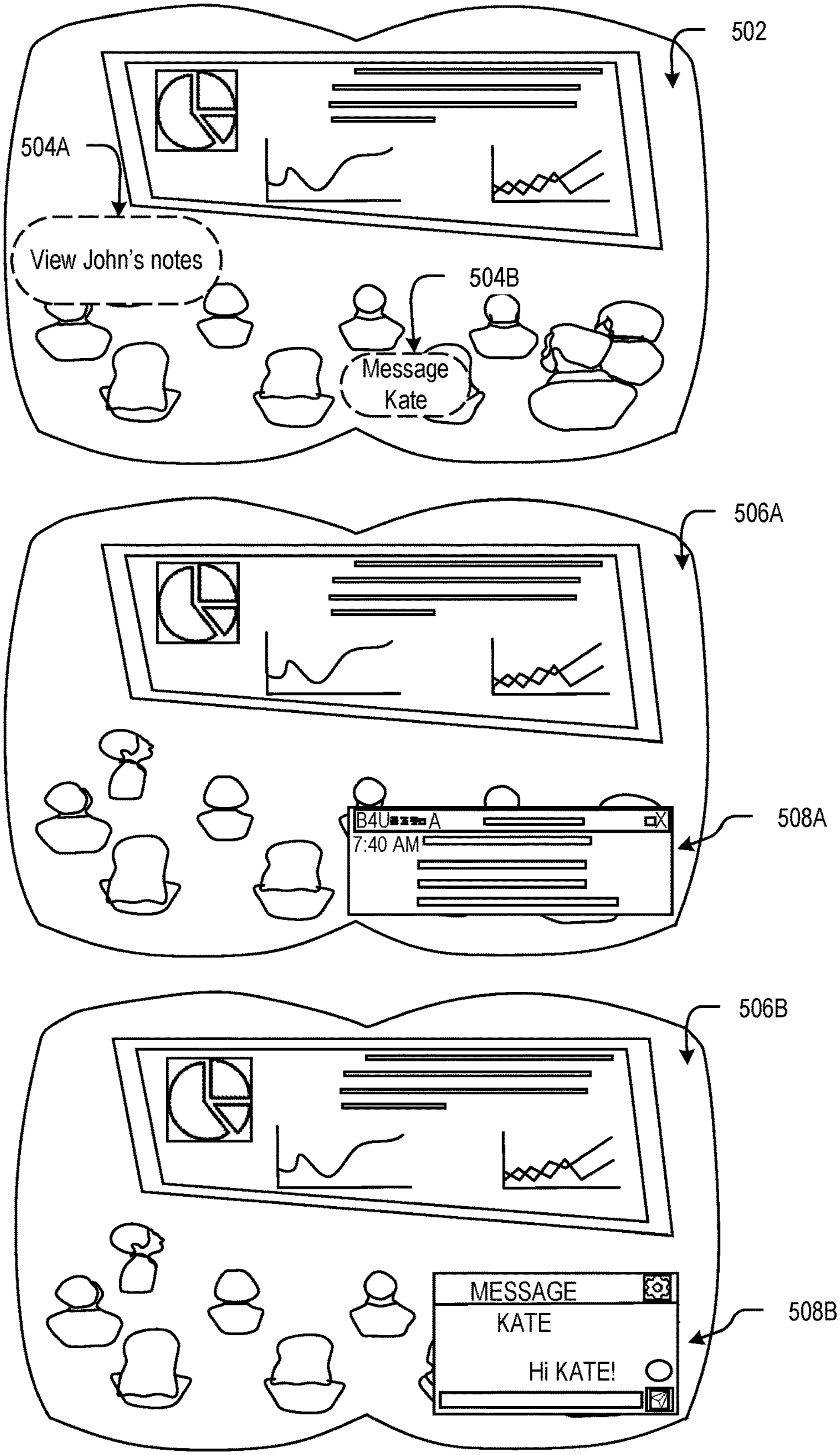
FIG. 5 illustrates an exemplary computer unit in which or with which embodiments of the present invention may be utilized.

FIG. 5 illustrates another scenario when plurality of students are attending a lecture. Based on the contextual data 214 associated with a student and analysis of a real-time scene 502, the student may be presented with one or more recommendations 504A and 504B. Consider the student always prefers to view the notes of another student named John. Thus, a recommendation 504A to view the notes of John is generated. Consider a professor, during the lecture, states that the student should get in touch with another student named Kate for a project. Thus, a recommendation 504A to initiate conversation with Kate is generated. Based on the recommendation selected by the user, the real-time scene 502 may be modified. For example, if the student selects the recommendation 504A, a modified scene 506A of the lecture is generated to include a modified object 508A. The modified object 508A may show digital or physical notes of John. Similarly, if the student selects the recommendation 504B, a modified scene 506B of the lecture is generated to include a modified object 508B. The modified object 508A may show chat box enabling the student to chat with Kate.

In some non-limiting embodiments or aspects, the processing unit 102 may receive data for rendering the modified scene 222 via the I/O interface 114. The received data may include, but is not limited to, at least one of the contextual data 214, the real-time scene 216 and the like. Also, the processing unit 102 may transmit data for rendering the modified scene 222 via the I/O interface 114. The transmitted data may include, but is not limited to, the one or more modifiable contents 218, the modified scene 222, and the like.

The other data 224 may comprise data, including temporary data and temporary files, generated by modules for performing the various functions of the processing unit 102. The one or more modules 116 may also include other modules 212 to perform various miscellaneous functionalities of the processing unit 102. It will be appreciated that such modules may be represented as a single module or a combination of different modules.

In an embodiment, the preferences and recommendations of the user 106 may be utilized to train the one or more modules 116 to dynamically render the modified scene 222 to the at least one user 106 in the immersive environment.

Some non-limiting embodiments or aspects of the present disclosure focuses on modifying the content rendered to the user based on contextual data 214 which include real-time data and pre-stored data as well. By which, accurate modification of the scene may be achieved to output desired content. Further, rather than modifying the complete scene, the present disclosures focus on modifying only the modifiable objects. Thus, requirements of resources to modify the scene and render the modified scene is reduced. The modified scene is rendered at higher rate.

Figure 6:
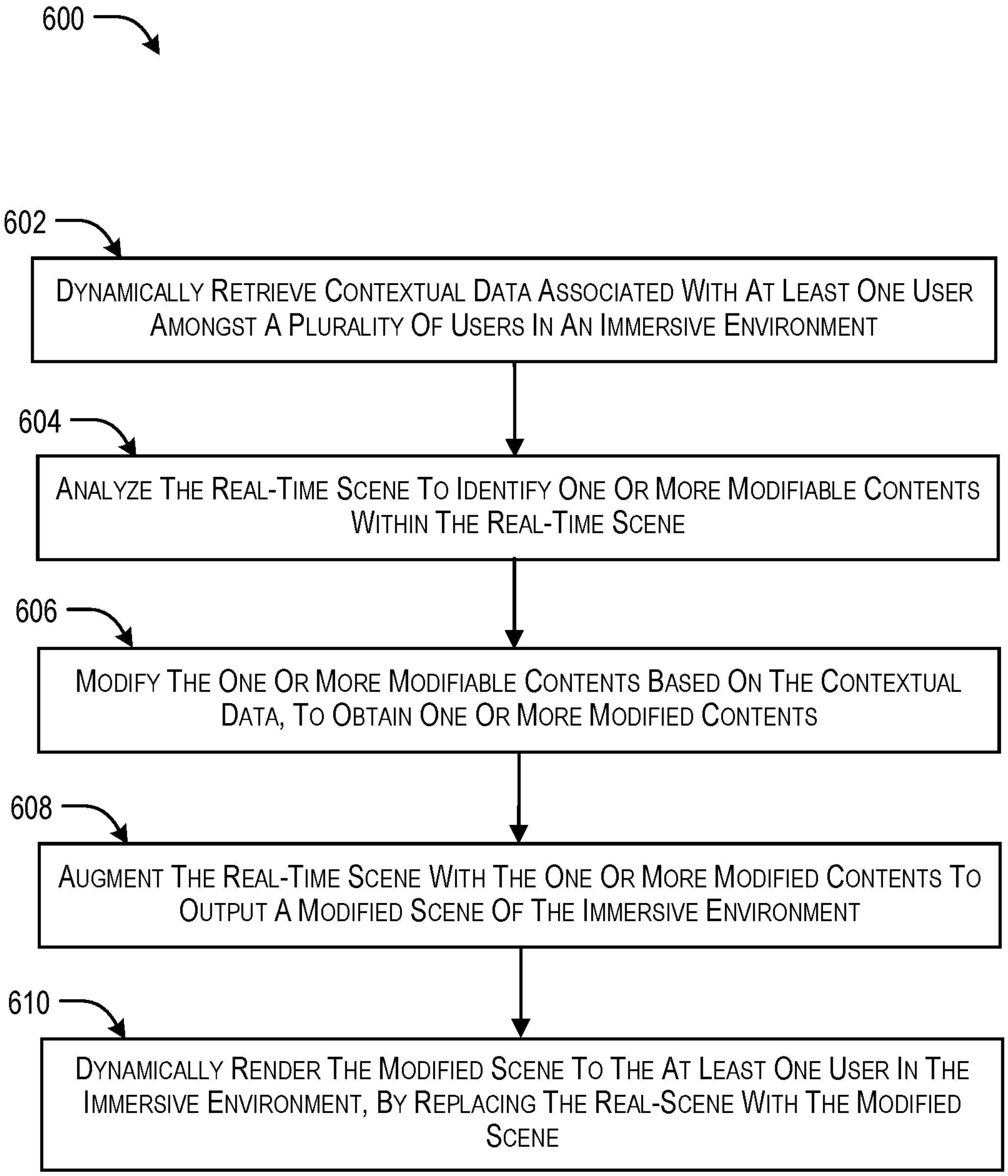
FIG. 6 is an exemplary process of processing unit for rendering a modified scene to the user in an immersive environment, in accordance with an embodiment of the present invention.

FIG. 6 shows an exemplary process of a processing unit 102 for rendering the modified scene to the at least one user in the immersive environment, in accordance with an embodiment of the present disclosure. Process 600 for rendering the modified scene includes steps coded in form of executable instructions to be executed by a processing unit associated with the immersive environment with the at least one presenter and the one or more attendees.

At block 602, the processing unit may be configured to dynamically retrieve the contextual data associated with the at least one user amongst the plurality of users in the immersive environment. The contextual data may be retrieved during rendering of the real-time scene to the at least one user within the immersive environment. The contextual data may include but is not limited to, the context of the real-time scene, the real-time conversation between at least two users amongst the plurality of users, the type of the at least one user, the preferences and the inputs of the at least one user, and the intent related to rendering of the real-time scene to the at least one user.

At block 604, the processing unit may be configured to analyze the real-time scene to identify the one or more modifiable contents within the real-time scene. One or more image processing techniques, known to a person skilled in the art, may be implemented to analyze the real-time and identify the one or more modifiable contents.

At block 606, the processing unit may be configured to modify the one or more modifiable contents based on the contextual data, to obtain one or more modified contents. In an embodiment, the one or more modifiable contents comprises at least one of the one or more modifiable objects amongst plurality of objects present in the real-time scene and the one or more modifiable regions within the real-time scene. In an embodiment, the one or more modifiable contents are modified by selecting at least one modifiable object amongst the one or more modifiable objects and modifying the at least one modifiable object based on the contextual data to obtain the one or more modified contents. The contextual data indicates the at least one modifiable object. In an embodiment, the one or more modifiable contents are modified by selecting at least one modifiable region amongst the one or more modifiable regions, based on the contextual data, creating one or more new objects relating to the contextual data and inserting the one or more new objects within the at least one modifiable region to obtain the one or more modified contents.

At block 608, the processing unit may be configured to augment the real-time scene with the one or more modified contents to output a modified scene of the immersive environment.

At block 610, the processing unit may be configured to dynamically render the modified scene to the at least one user in the immersive environment, by replacing the real-time scene with the modified scene. In an embodiment, the plurality of users may comprise a presenter and one or more attendees. In such an embodiment, when at least one user is one of the presenter and an attendee amongst the one or more attendees, dynamically rendering the modified scene may include to provide a recommendation to the presenter, indicating the modified scene. In an embodiment, along with the recommendation, an option may also be provided. The option may prompt dynamic rendering of the modified scene to the at least one user.

As illustrated in FIG. 6, the method 600 may include one or more steps for executing processes in the processing unit 102. The method 600 may be described in the general context of computer executable instructions. Generally, computer executable instructions can include routines, programs, objects, components, data structures, procedures, modules, and functions, which perform particular functions or implement particular abstract data types.

The order in which steps in the method 600 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Figure 7:
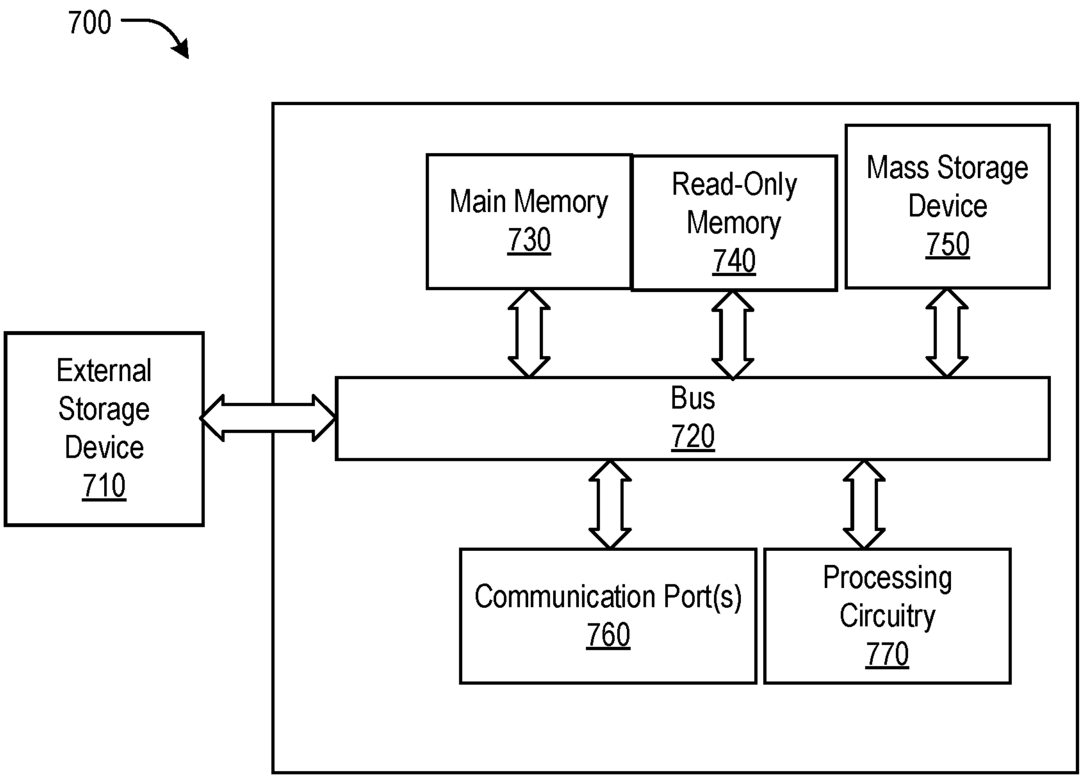
FIG. 7 illustrates an exemplary computer unit in which or with which embodiments of the present invention may be utilized.

FIG. 7 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps or the steps may be performed by a combination of hardware, software and/or firmware. As shown in FIG. 7, the computer system 700 includes an external storage device 710, bus 720, main memory 730, read-only memory 740, mass storage device 750, communication port(s) 760, and processing circuitry 770.

Those skilled in the art will appreciate that the computer system 700 may include more than one processing circuitry 770 and one or more communication ports 760. The processing circuitry 770 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 770 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 770 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 770 may include various modules associated with embodiments of the present disclosure.

The communication port 760 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 760 may be any RS-232 port for use with a modem-based dialup connection, a 10/100 Ethernet port, a Gigabit, or a 10 Gigabit port using copper or fiber, a serial port, a parallel port, or other existing or future ports. The communication port 760 may be chosen depending on a network, such as a Local Area Network (LAN), Wide Area Network (WAN), or any network to which the computer system 700 may be connected.

The main memory 730 may include Random Access Memory (RAM) or any other dynamic storage device commonly known in the art. Read-only memory (ROM) 740 may be any static storage device(s), e.g., but not limited to, a Programmable Read-Only Memory (PROM) chips for storing static information, e.g., start-up or BIOS instructions for the processing circuitry 770.

The mass storage device 750 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 730. The mass storage device 750 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 720 communicatively couples the processing circuitry 770 with the other memory, storage, and communication blocks. The bus 720 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 770 to the software system.

Optionally, operator and administrative interfaces, e.g., a display, keyboard, and a cursor control device, may also be coupled to the bus 720 to support direct operator interaction with the computer system 700. Other operator and administrative interfaces may be provided through network connections connected through the communication port(s) 760. The external storage device 710 may be any kind of external hard drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 700 may be accessed through a user interface. The user interface application may be implemented using any suitable architecture. For example, it may be a stand-alone application wholly implemented on the computer system 700. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 700 is retrieved on-demand by issuing requests to a server remote to the computer system 700. For example, computer system 700 may receive inputs from the user via an input interface and transmit those inputs to the remote server for processing and generating the corresponding outputs. The generated output is then transmitted to the computer system 700 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed is:

1. A method for rendering a modified scene to a user in an immersive environment, the method comprising:

dynamically retrieving, by a processing unit, contextual data associated with at least one user amongst a plurality of users in an immersive environment, during rendering of a real-time scene to the at least one user within the immersive environment, wherein the contextual data comprises at least one of context of the real-time scene, real-time conversation between at least two users amongst the plurality of users, type of the at least one user, preferences and inputs of the at least one user, and intent related to rendering of the real-time scene to the at least one user, wherein the contextual data is captured from one or more interaction signals including at least real-time conversation between users;

analyzing, by the processing unit, the real-time scene to identify one or more modifiable contents within the real-time scene, wherein the one or more modifiable contents comprises at least one of one or more modifiable objects amongst a plurality of objects present in the real-time scene;

modifying, by the processing unit, the one or more modifiable contents based on the contextual data, to obtain one or more modified contents, wherein modifying comprises selecting at least one modifiable object based on the contextual data and modifying the selected object based on the contextual data, and wherein the modifying is performed without receiving an explicit user command for modification of the one or more modifiable contents;

augmenting, by the processing unit, the real-time scene with the one or more modified contents to output a modified scene of the immersive environment; and dynamically rendering, by the processing unit, the modified scene to the at least one user in the immersive environment, by replacing the real-time scene with the modified scene.

2. The method of claim 1, wherein modifying the one or more modifiable contents based on the contextual data to obtain the one or more modified contents, comprises:

selecting at least one modifiable region amongst the one or more modifiable regions, based on the contextual data;

creating one or more new objects relating to the contextual data; and inserting the one or more new objects within the at least one modifiable region to obtain the one or more modified contents.

3. The method of claim 1, wherein the plurality of users comprises a presenter and one or more attendees.

4. The method of claim 3, wherein, when at least one user is one of the presenter and an attendee amongst the one or more attendees, dynamically rendering the modified scene comprises:

providing a recommendation to the presenter, indicating the modified scene, wherein, optionally, an option is provided along with the recommendation, said option prompts dynamic rendering of the modified scene to the at least one user.

5. A processing unit for rendering a modified to a user in an immersive environment, the processing unit comprises:

one or more processors; and a memory communicatively coupled to the one or more processors, wherein the memory stores processor-executable instructions, which, on execution, cause the one or more processors to:

dynamically retrieve contextual data associated with at least one user amongst a plurality of users in an immersive environment, during rendering of a real-time scene to the at least one user within the immersive environment, wherein the contextual data comprises at least one of context of the real-time scene, real-time conversation between at least two users amongst the plurality of users, type of the at least one user, preferences and inputs of the at least one user, and intent related to rendering of the real-time scene to the at least one user, wherein the contextual data is captured from one or more interaction signals including at least real-time conversation between users;

analyze the real-time scene to identify one or more modifiable contents within the real-time scene, wherein the one or more modifiable contents comprises at least one of one or more modifiable objects amongst a plurality of objects present in the real-time scene;

modify the one or more modifiable contents based on the contextual data, to obtain one or more modified contents, wherein modifying comprises selecting at least one modifiable object based on the contextual data and modifying the selected object based on the contextual data, and wherein the modifying is performed without receiving an explicit user command for modification of the one or more modifiable contents;

augment the real-time scene with the one or more modified contents to output a modified scene of the immersive environment; and dynamically render the modified scene to the at least one user in the immersive environment, by replacing the real-time scene with the modified scene.

6. The processing unit of claim 5, wherein the processing unit is configured to modify the one or more modifiable contents by:

selecting at least one modifiable region amongst the one or more modifiable regions, based on the contextual data;

creating one or more new objects relating to the contextual data; and inserting the one or more new objects within the at least one modifiable region to obtain the one or more modified contents.

7. The processing unit of claim 5, wherein the plurality of users comprises a presenter and one or more attendees.

8. The processing unit of claim 7, wherein, when at least one user is one of the presenter and an attendee amongst the one or more attendees, dynamically rendering the modified scene comprises:

providing a recommendation to the presenter, indicating the modified scene, wherein, optionally, an option is provided along with the recommendation, said option prompts dynamic rendering of the modified scene to the at least one user.

9. A non-transitory computer-readable medium including instructions stored thereon that when processed by one or more processors cause a system to perform operations comprising:

dynamically retrieving contextual data associated with at least one user amongst a plurality of users in an immersive environment, during rendering of a real-time scene to the at least one user within the immersive environment, wherein the contextual data comprises at least one of context of the real-time scene, real-time conversation between at least two users amongst the plurality of users, type of the at least one user, preferences and inputs of the at least one user, and intent related to rendering of the real-time scene to the at least one user, wherein the contextual data is captured from one or more interaction signals including at least real-time conversation between users;

analyzing the real-time scene to identify one or more modifiable contents within the real-time scene, wherein the one or more modifiable contents comprises at least one of one or more modifiable objects amongst a plurality of objects present in the real-time scene;

modifying the one or more modifiable contents based on the contextual data, to obtain one or more modified contents, wherein modifying comprises selecting at least one modifiable object based on the contextual data and modifying the selected object based on the contextual data, and wherein the modifying is performed without receiving an explicit user command for modification of the one or more modifiable contents;

augmenting the real-time scene with the one or more modified contents to output a modified scene of the immersive environment; and dynamically rendering the modified scene to the at least one user in the immersive environment, by replacing the real-time scene with the modified scene.

10. The non-transitory computer-readable medium of claim 9, wherein modifying the one or more modifiable contents based on the contextual data to obtain the one or more modified contents, comprises:

selecting at least one modifiable region amongst the one or more modifiable regions, based on the contextual data;

creating one or more new objects relating to the contextual data; and inserting the one or more new objects within the at least one modifiable region to obtain the one or more modified contents.

11. The non-transitory computer-readable medium of claim 9, wherein the plurality of users comprises a presenter and one or more attendees.

12. The non-transitory computer-readable medium of claim 11, wherein, when at least one user is one of the presenter and an attendee amongst the one or more attendees, dynamically rendering the modified scene comprises:

providing a recommendation to the presenter, indicating the modified scene, wherein, optionally, an option is provided along with the recommendation, said option prompts dynamic rendering of the modified scene to the at least one user.

* * * * *